US012242721B2

(12) United States Patent
Prasad et al.

(10) Patent No.: US 12,242,721 B2
(45) Date of Patent: Mar. 4, 2025

(54) METHODS AND APPARATUS TO PROFILE PAGE TABLES FOR MEMORY MANAGEMENT

(71) Applicant: Intel Corporation, Santa Clara, CA (US)

(72) Inventors: Aravinda Prasad, Bangalore (IN); Sandeep Kumar, Delhi (IN); Sreenivas Subramoney, Bangalore (IN); Andy Rudoff, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 803 days.

(21) Appl. No.: 17/214,534

(22) Filed: Mar. 26, 2021

(65) Prior Publication Data
US 2021/0232312 A1 Jul. 29, 2021

(51) Int. Cl.
G06F 3/06 (2006.01)
(52) U.S. Cl.
CPC .......... G06F 3/0604 (2013.01); G06F 3/0644 (2013.01); G06F 3/0679 (2013.01)
(58) Field of Classification Search
CPC .... G06F 3/0604; G06F 3/0644; G06F 3/0679; G06F 2212/654; G06F 12/1009; G06F 12/0246; G06F 2212/7201
See application file for complete search history.

(56) References Cited

U.S. PATENT DOCUMENTS

| | | | |
|---|---|---|---|
| 9,063,866 B1* | 6/2015 | Tati | G06F 12/10 |
| 2012/0023300 A1* | 1/2012 | Tremaine | G06F 12/1009 |
| | | | 711/164 |
| 2015/0363325 A1* | 12/2015 | Baskakov | G06F 12/12 |
| | | | 711/173 |
| 2022/0317925 A1* | 10/2022 | Lepak | G06F 3/0679 |

OTHER PUBLICATIONS

Lagar-Cavilla et al., "Software-Defined Far Memory in Warehouse-Scale Computers," ASPLOS '19, Apr. 13-17, 2019, Providence, RI, USA, 14 pages.
European Patent Office, "Extended European Search Report," issued in connection with European patent Application No. 22153442.3, dated Jul. 20, 2022, 10 pages.
European Patent Office, "Communication pursuant to Article 94(3) EPC," issued in connection with European Patent Application No. 22 153 442.3-1224, dated Mar. 20, 2024, 5 pages.

* cited by examiner

Primary Examiner — Zhuo H Li
(74) Attorney, Agent, or Firm — HANLEY, FLIGHT & ZIMMERMAN, LLC

(57) ABSTRACT

Disclosed Methods, Apparatus, and articles of manufacture to profile page tables for memory management are disclosed. An example apparatus includes a processor to execute computer readable instructions to: profile a first page at a first level of a page table as not part of a target group; and in response to profiling the first page as not part of the target group, label a data page at a second level that corresponds to the first page as not part of the target group, the second level being lower than the first level.

25 Claims, 8 Drawing Sheets

METHODS AND APPARATUS TO PROFILE PAGE TABLES FOR MEMORY MANAGEMENT

FIELD OF THE DISCLOSURE

This disclosure relates generally to processors, and, more particularly, to methods and apparatus to profile page tables for memory management.

BACKGROUND

In processing systems, main memory and/or non-volatile memory stores data in page table that includes data pages that may be accessed by an application and/or kernel via an operating system of the processing system. In order for the operating system to access the main memory and/or non-volatile memory, a page table may be used. A page table is a data structure that stores a mapping between virtual addresses used by the operating system and physical addresses of the main memory and/or non-volatile memory. In this manner, when the operating system attempts to access data from a data page in the main memory and/or non-volatile memory, the operating system sends the virtual address corresponding to the data page to hardware of the processing system. The hardware then uses the page table to determine the physical address of the data page in the main memory and/or non-volatile memory based on the virtual address and access the data for the operating system. However, accessing data from remote memory attached to a first processor socket from a second processor socket takes a large amount of time to perform. Accordingly, local memory may be used to store portions of the data pages of the remote memory and/or non-volatile memory. The local memory is faster than the remote memory and/or non-volatile memory.

BRIEF DESCRIPTION OF THE DRAWINGS

The figures are not to scale. In general, the same reference numbers will be used throughout the drawing(s) and accompanying written description to refer to the same or like parts.

Figure 1:
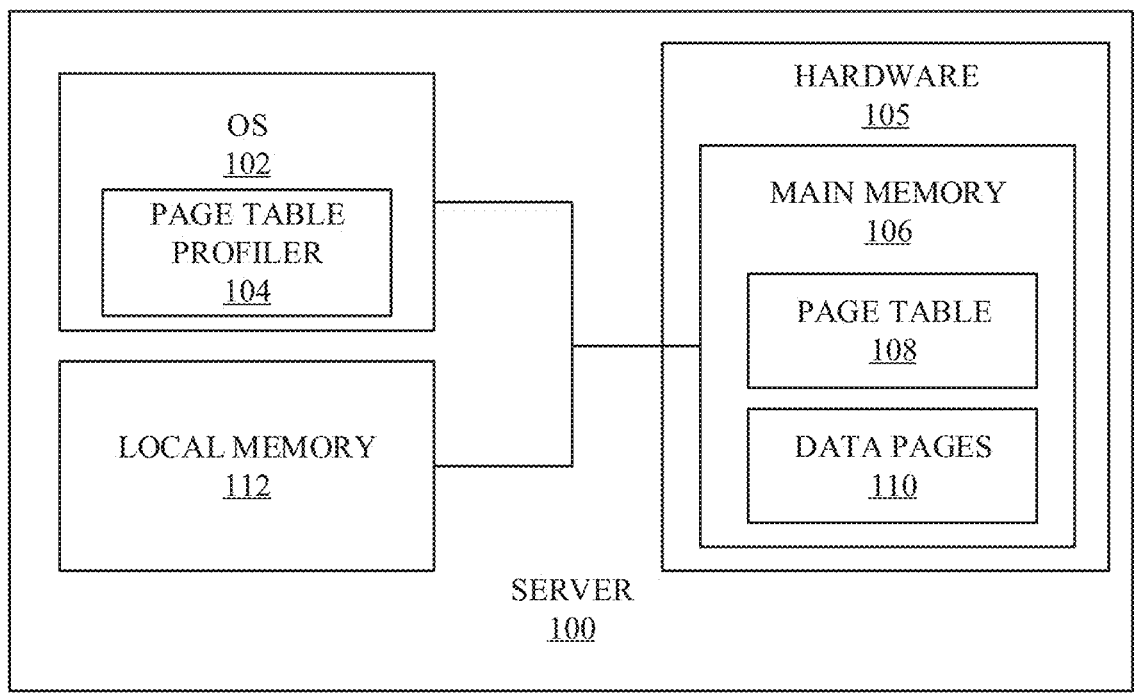
FIG. 1 is a block diagram of an example implementation of a server described in conjunction with examples disclosed herein.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A processing system (e.g., a computer, a server, etc.) includes electronic circuitry that executes instructions making up a program or workload of an application and/or a kernel. Additionally, the processing system includes hardware components (e.g., main memory) that stores data that the application and/or kernel can access. The processing system includes an operating system (e.g., system software) that manages the computer hardware, software resources, and provides services for the application and/or kernels implemented on the processing system. Accordingly, when an application and/or a kernel needs to access main memory (e.g., to read and/or write data to/from the main memory), the operating system transmits a request to the hardware to access data pages from a page table stored in the memory.

In some processing systems (e.g., a non-uniform memory access (NUMA) system), local memory is the memory dual inline memory module (DIMM) that is attached to a same central processing unit (CPU) socket and remote memory is the memory DIMM that is attached to another CPU socket on the same system. The size and type of local and remove memory may be the same, similar, or different. However, accessing data from local memory (e.g., memory attached to the same CPU socket) is faster compared to accessing the data in remote memory that is attached to a different (e.g., remove CPU socket). For example, on system with two sockets (S1 attached to memory M1 and S2 attached to memory M2), accessing M1 from S1 is local and faster while accessing M2 from S1 is remote and slower.

In other processing system (e.g., including tiered or heterogeneous memory system), the local memory may be Dynamic Random Access Memory (DRAM) and the remote memory may be non-volatile memory. Non-volatile memory is slower than to DRAM, but is larger and can store more data. The non-volatile memory may be part of the system's main memory and is attached to the CPU socks.

In some examples, a page table is stored in the main memory that maps virtual addresses used by the operating system to physical addresses in the remote memory. In this manner, when the operating system transmits a request to access a data page (e.g., using a virtual address) in the remote memory, the hardware can use the page table to determine the physical address corresponding to the location of the data page. To overcome the amount of time (e.g., latency) it takes to access data from remote memory, the operating system may obtain data pages from the remote memory and store them locally in local memory. In this manner, the operating system can use and/manipulate the data page locally in local memory with less latency by interfacing with the remote memory less often.

To most efficiently utilize the local memory, the operating system attempts to store the most frequently accessed data pages (e.g., hot data pages) in the local memory. As used herein, data pages that are frequently accessed are defined as hot data pages. For example, data pages that are accessed more than a threshold number of times within a duration of time are defined as hot data pages. Data pages that are not frequently accessed are defined as cold data pages. For example, data pages that are accessed less than the threshold number of times within the duration of time are defined as cold data pages. To determine which data pages are hot and which data pages are cold, the operating system performs a profiling protocol to profile the data pages as hot or cold. After the operating system profiles the data pages, the operating system or another component can (A) store hot data pages into local memory, (B) move cold data pages from out of local memory, etc. Examples disclosed herein profile pages as hot or cold, and/or otherwise determine the frequency of data page access, so that the OS can move the data pages between local and remote memory, between fast and slow memory, etc.

Additionally or alternatively, data page profiling may be used to promote and/or demote virtual address-to-physical address mappings to/from huge pages. Huge pages are hardware supported feature that reduces translation look-ahead buffer misses during a virtual-to-physical address translation. To improve the efficiency of huge pages, examples disclose herein quickly identify and promote data pages to huge pages, rather than promoting an arbitrary set of data pages to huge data pages. Accordingly, profiling of data pages is helpful to promote a mapping of a hot data page into the huge table and/or demote a mapping of a cold data page from the huge table, thereby ensuring that the huge table includes hot data pages that are frequently accessed.

A prior data page profiling protocol includes linearly scanning every data page in the main memory to determine which data pages are accessed within a predetermined duration of time. Accordingly, if there are 10,000 data pages in remote memory, prior data page profiling protocols have to access and process 10,000 data pages from remote memory to determine whether the data pages are hot or cold. Accordingly, linearly scanning every data page using prior techniques is time consuming and requires processor resources. Additionally, when the operating system is profiling, the operating system cannot use resources to perform other tasks. Examples disclosed herein reduce the amount of time and resources needed to profile data pages. Thus, data pages can be profiled faster and with less resources using examples disclosed herein than using prior techniques, thereby allowing the operating system more time and resources to perform other tasks.

The page table used by the operating system and memory that maps virtual addresses to physical addresses is structured in a hierarchy of levels (e.g., also referred to as layers) that map to the data pages stored in main memory. For example, the page table includes a first-highest level including a page (e.g., page global director page (PGD)) that is split into a second-highest level that includes a plurality of pages (e.g., page upper director pages (PUDs)). Each of the PUDs of the second-highest level is split into a third-highest level that includes a plurality of pages (e.g., page middle directory pages (PMDs)). Each of the PMDs of the third-highest level is split into a leaf level that includes a plurality of pages (e.g., page table entry pages (PTEs)). Each of the PTEs of the leaf level corresponds to a plurality of the data pages stored in main memory that are allocated by the operating system to the application. Whenever the hardware accesses a data page from main memory, the access is flagged for the data page and all the higher level pages that correspond to the data page (e.g., the PTE, the PMD, the PUD, and the PGD that correspond to the data page). Examples disclosed herein leverage the hierarchy of the page table corresponding to the data pages to identify large sets of data pages that are cold. For example, if during profiling the operating system determines that a highest-level page (e.g., a PUD) has not been accessed during a duration of time, examples disclosed herein determine that all of the data pages that correspond to the highest-level page are cold. In this manner, examples disclosed herein can profile a plurality of data pages based on a single page scan of the high-level data as opposed to the plurality of profiling scans for the plurality of data pages in the prior profiling protocols.

When examples disclosed herein determine that the highest-level page has been accessed during a duration of time, examples disclosed herein perform another round of profiling for the second-highest level pages that correspond to the accessed highest-level page to determine which of the second-highest level pages has been accessed, and the process continues until examples disclosed herein determine the data pages of the main memory that have been accessed. In this manner, for a 4-tier page table (e.g., PUD, PMD, PTE, and data page), examples disclosed herein can profile all data pages as target pages or non-target pages (e.g., hot or cold) using 4 profiling rounds, regardless of the number of data pages in the page table.

FIG. 1 is a block diagram of an example implementation of an example server 100. The example server 100 of FIG. 1 includes an example operating system (OS) 102, an example page table profiler 104, example hardware 105, example main memory 106, an example page table 108, example page table pages 110, and local memory 112. Although FIG. 1 corresponds to the example server 100, examples disclosed herein may be implemented in any type of processing system and/or computing system.

The example server 100 of FIG. 1 is a computer system the includes software, hardware, and/or firmware to perform tasks defined by an application and/or kernel. The example server 100 utilizes processor resources (e.g., the example memories 106, 112, register(s) and/or logic circuitry of processor core(s)) and utilizes the OS 102 to execute instructions to implement an application and/or kernel.

The example OS 102 of FIG. 1 is system software that executes (e.g., using processor cores) instructions and/or a workload from an application and/or kernel (e.g., by reading and/or writing data). The example OS 102 manages the computer hardware, software resources, etc. to be able to access (e.g., read and/or write) data to/from data pages (e.g., the data pages 110) stored in the example main memory 106. To access the data pages 110 in the main memory 106, the example OS 102 transmits a virtual address to the hardware 105 and the hardware 105 reads and/or writes the data to the data page that corresponds to the virtual address. The example OS 102 includes the example page table profiler 104. After the example page table profiler 104 profiles the data pages, the OS 102 causes a copy of the hot data pages to be stored in the local memory 112 and/or causes the cold data pages stored in the local memory 112 to be removed from the local memory 112.

The example page table profiler 104 of FIG. 1 profiles the pages of the page table 108 by leveraging the hierarchy of the page table 108. For example, to profile the data pages of the page table(s) 110 as target pages or non-target pages (e.g., hot and/or cold), the example page table profiler 104 profiles the highest-level pages of the page table 108 to determine which pages of the highest-level have been accessed (e.g., hot) and which pages of the highest-level have not been accessed (e.g., cold). The example page table profiler 104 tags (e.g., labels) all the data pages that correspond to the cold pages at the highest-level as cold data pages. The example page table profiler 104 then performs a subsequent profiling round using the second-highest level of data pages that correspond to the hot highest level pages, and the processes is repeated per level (e.g., tagging data pages as cold when a corresponding higher level is tagged as cold and repeating the process at the next level (e.g., a lower level) for hot data pages), until all of the main memory of the process/application have been identified as hot or cold. The example page table profiler 104 is further described below in conjunction with FIG. 2.

The example hardware 105 of FIG. 1 obtains access requests (e.g., to read and/or write data to/from the main memory 106) from the example OS 102. As described above, the access request includes a virtual address corresponding to a data page to be accessed. The example hardware 105 uses the page table 108 to determine the physical memory address corresponding to the location of the data page based on the virtual address. In some examples, the OS 102 may promote and/or demote data to/from huge pages based on the profiled data. For example, the OS 102 may promote mappings corresponding to hot data pages to a huge page and/or may demote huge page mappings corresponding to cold data pages to base pages. The example hardware 105 of FIG. 1 includes the main memory 106.

The example main memory 106 of FIG. 1 stores data pages in the page table pages 110 that the OS 102 may access (e.g., to be read from and/or to be written to). The example main memory 106 may be non-volatile memory and/or memory that is located at a remote CPU socket. Additionally, the example main memory 106 includes a section of memory to store the example page table 108. As described above, the page table 108 is a tree-based structure that includes levels (e.g., also referred to as layers) that map a virtual address to a physical address. In this manner, the hardware 105 can use the page table 108 to access data pages from the page table pages 110 based on the virtual address from the OS 102. The data pages 110 include data that an application and/or kernel may access via the OS 102. An example implementation of the page table 108 and/or the data pages 110 is further described below in conjunction with FIG. 4.

The example local memory 112 is memory that is implemented in the same (e.g., local) socket as the OS 102. Accordingly, the example local memory 112 is faster than the example remote memory. The example local memory 112 stores a subsection of the data pages 110 stored in the example main memory 106. As described above, the example OS 102 profiles the page table pages 110 to attempt to identify more frequently accessed data pages. In this manner, the OS 102 can store the hot data pages in the local memory 112 to increase efficiency and speed of executing instructions from an application and/or kernel. In some examples, the local memory 112 may be located in a different section of the example server 100 (e.g., part of the main memory 106)

Figure 2:
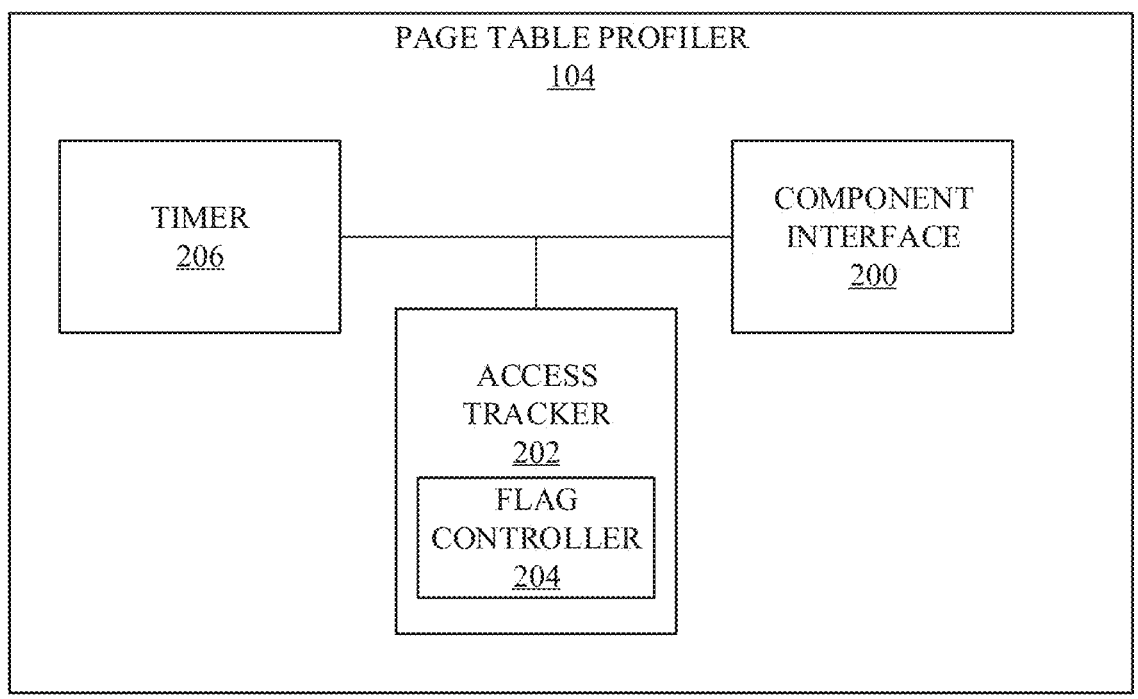
FIG. 2 is a block diagram of an example implementation of the page table profiler of FIG. 1.

FIG. 2 is a block diagram of an example implementation of the page table profiler 104 of FIG. 1. The example page table profiler 104 includes an example component interface 200, an example access tracker 202, an example flag controller 204, and an example timer 206.

The example component interface 200 interfaces with other components of the example server 100. For example, the component interface 200 may obtain instructions to profile page table pages from the OS 102. Additionally, the component interface 200 may interface with the page table 108 of the example main memory 106 (e.g., directly or via the hardware 105) as part of the profiling of the page table pages 110. For example, if the profiling includes setting and/or reading flags corresponding to the page table 108, the component interface 200 may access the page table 108 to set and/or read the flags. In some examples, another component may be used to profile the page table pages 110. For example, a memory address tracker may capture and process telemetry data on memory access patterns to identify hot and/or cold pages of the page table 108. In some examples, the memory address tracker may be implemented by the access tracker 202. In such examples, the component interface 200 may obtain the profiling data from the memory address tracker.

The example access tracker 202 of FIG. 2 tracks accesses to one or more pages in the page table 108 and/or data pages 110 using a profiling protocol. For example, in an OS-triggered fault-profiling protocol, the access tracker 202 may utilize the example flag controller 204 to flag the page table page as invalid by changing the access permission, removing an entry to trigger a page fault, etc. In this manner, the access tracker 202 can wait a duration of time using the example timer 206 and then check the flags and/or faults to determine if a page was accessed. For example, a minor fault is triggered by the hardware 105 when any data page mapped under a page in the page table 108 is accessed. In this manner, the access tracker 202 can track the accesses to the page table pages and label as hot or cold by checking for (a) changes in the flag and/or (b) triggered faults. Additionally or alternatively, for a memory address tracker profiling protocol, the example access tracker 202 can capture and/or obtain telemetry data on memory access patterns to profile a page of the page table 108 to identify access to the page. As described above, the access tracker 202 performs a first round based on the highest-level of pages and then repeats at lower levels when one or more of the higher levels is labeled as hot. In this manner, the example access tracker 202 is able to label data pages as hot or cold with just four profiling rounds (e.g., for the four levels in the hierarchy).

The example timer 206 of FIG. 2 tracks time. In this manner, the example access tracker 202 can determine how long to wait after flagging pages as invalid to check if the page has been accessed. In some examples, the timer 206 can include or be replaced with a counter that counts clock cycles. The amount of time may be any duration of time based on user and/or manufacturer preferences. Additionally, the duration of time may be based on the profiling. For example, the duration of time may be shorter to profile hot data pages and may be longer to profile cold data pages that have already been implemented in the local memory.

While an example manner of implementing the example OS 102 and/or the example page table profiler 104 of FIG. 1 is illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example component interface 200, the example access tracker 202, the example flag controller 204, and the example timer 206, and/or, more generally, the example page table profiler 104 of FIG. 2 and/or the OS 102 of FIG. 1 may be implemented by hardware, software, firmware and/or any combination of hardware, software and/or firmware. Thus, for example, any of the example component interface 200, the example access tracker 202, the example flag controller 204, and the example timer 206, and/or, more generally, the example page table profiler 104 of FIG. 2 and/or the OS 102 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example component interface 200, the example access tracker 202, the example flag controller 204, and the example timer 206, and/or, more generally, the example page table profiler 104 of FIG. 2 and/or the OS 102 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example page table profiler 104 and/or the OS 102 of FIG. 1 may include one or more elements, processes and/or devices in addition to, or instead of, those illustrated in FIGS. 1 and/or 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3A:
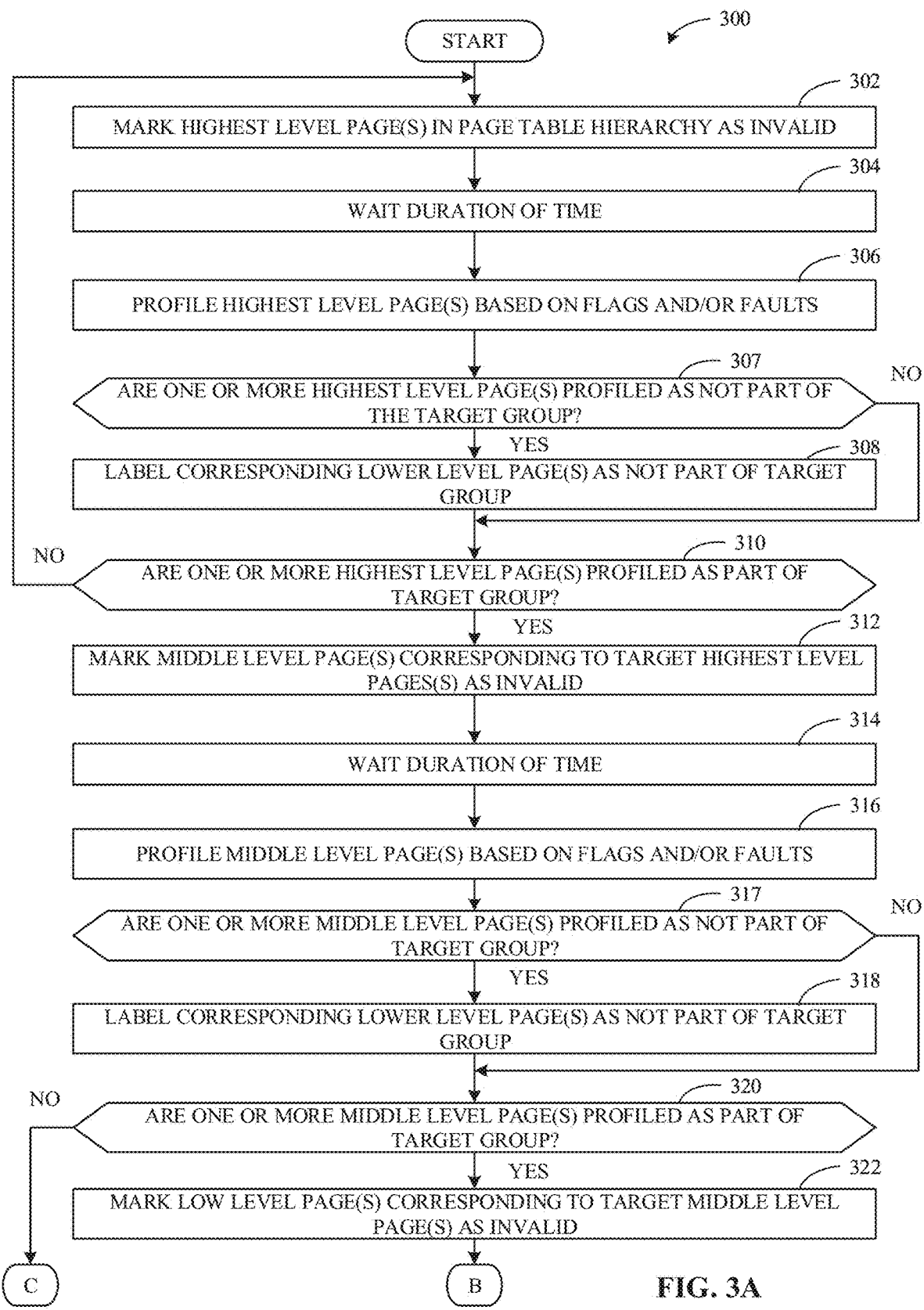
FIGS. 3A-3C illustrate a flowchart representative of example machine readable instructions that may be executed to implement the page table profiler of FIG. 1.
Figure 3B:
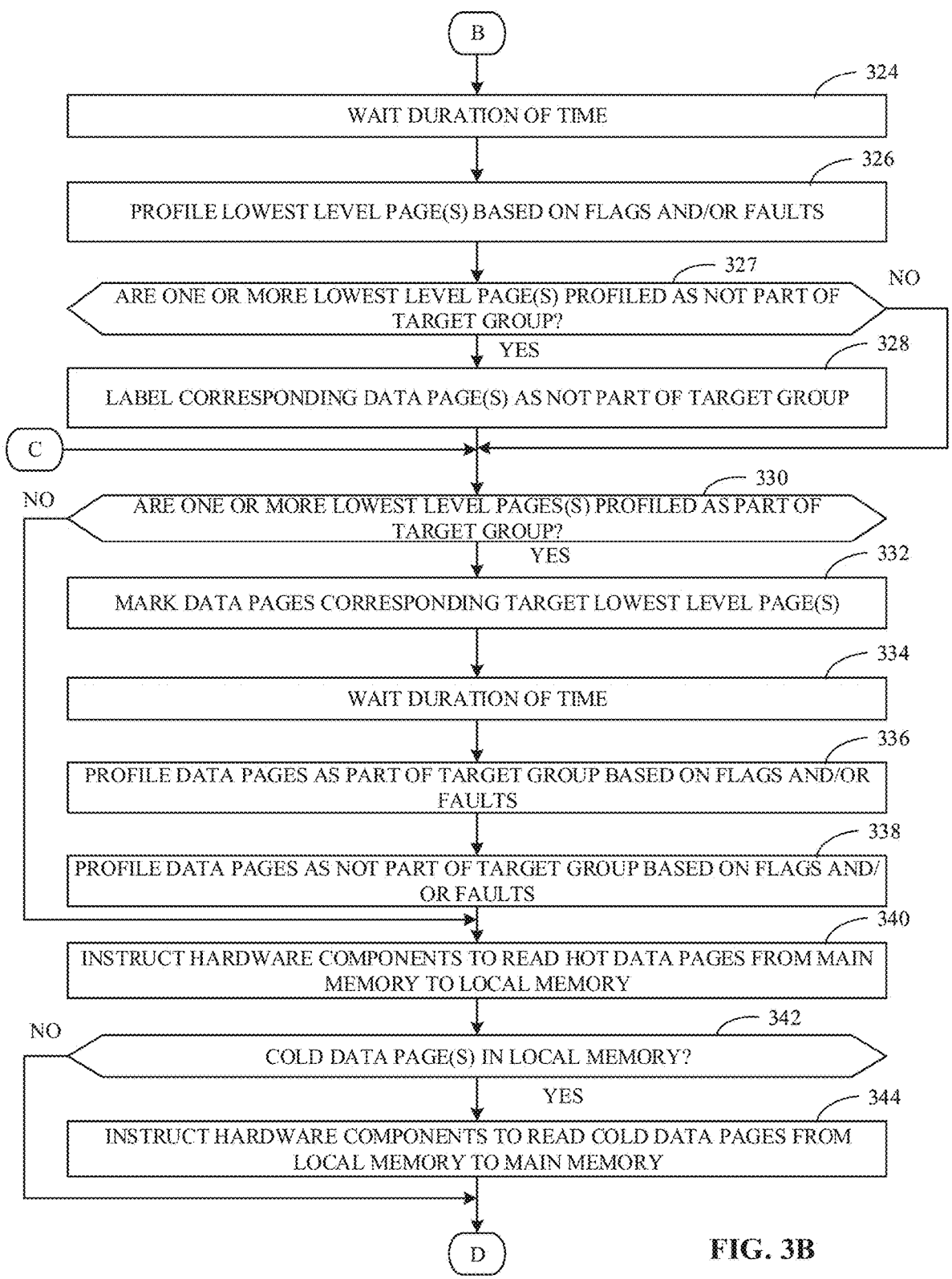
Figure 3C:
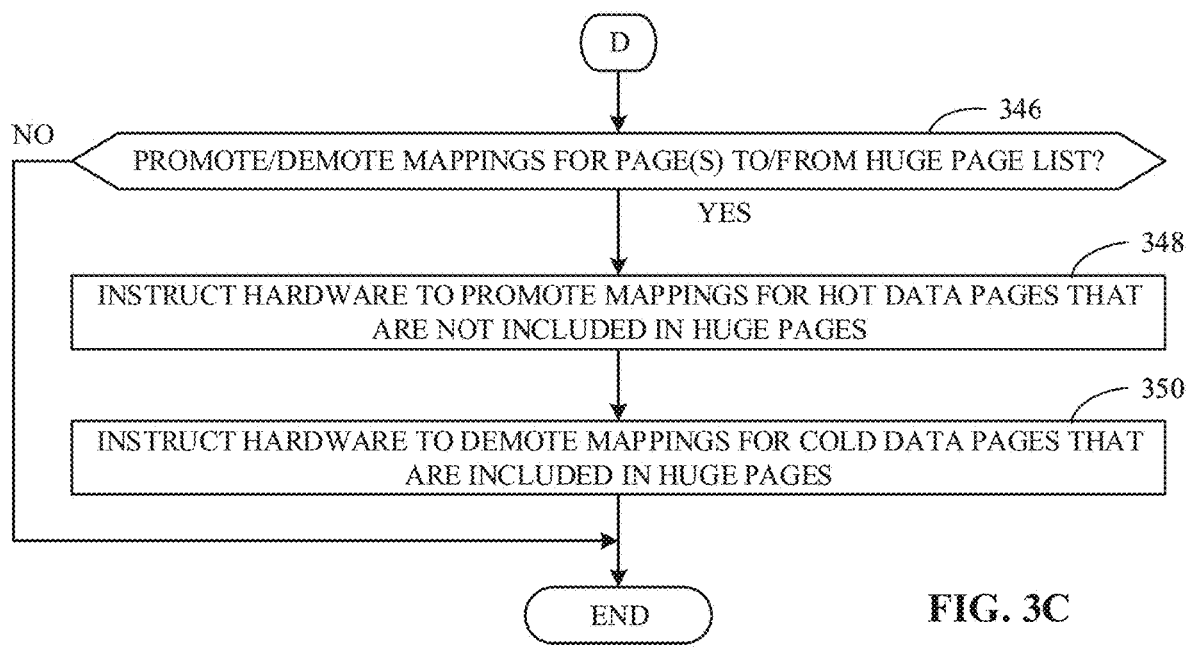

Flowcharts representative of example hardware logic, machine readable instructions, hardware implemented state machines, and/or any combination thereof for implementing the example page table profiler 104 and/or the OS 102 of FIGS. 1 and/or 2 are shown in FIGS. 3A-3C. The machine readable instructions may be one or more executable programs or portion(s) of an executable program for execution by a computer processor such as the processor 512 shown in the example processor platform 500 discussed below in connection with FIG. 5. The program(s) may be embodied in software stored on a non-transitory computer readable storage medium such as a CD-ROM, a floppy disk, a hard drive, a DVD, a Blu-ray disk, or a memory associated with the processor 512, but the entirety of the program(s) and/or parts thereof could alternatively be executed by a device other than the processor 512 and/or embodied in firmware or dedicated hardware. Further, although the example program(s) is/are described with reference to the flowchart illustrated in FIG. 5, many other methods of implementing the example page table profiler 104 and/or the OS 102 of FIGS. 1 and/or 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3A-3C may be implemented using executable instructions (e.g., computer and/or machine readable instructions) stored on a non-transitory computer and/or machine readable medium such as a hard disk drive, a flash memory, a read-only memory, a compact disk, a digital versatile disk, a local memory, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIGS. 3A-3C illustrate a flowchart representative of example machine readable instructions 300 that may be executed to implement the example page table profiler 104 and/or the example OS 102 (FIGS. 1 and/or 2) to profile data pages as hot or cold. Although the flowchart of FIGS. 3A-3C is described in conjunction with the example page table profiler 104 of the example server 100, other type(s) of page table profilers(s), and/or other type(s) of computing system(s) may be utilized instead. Although the example of FIGS. 3A-3C correspond to an OS-triggered fault-profiling protocol, examples disclosed herein can profile pages using any profiling protocol (e.g., memory address tracker profiling).

At block 302, the example flag controller 204 of the access tracker 202 marks the highest-level page(s) (e.g., the PUD page(s)) in the page table hierarchy as invalid. As described above, if the hardware 105 accesses a page of the page table 108 that is marked as invalid, a minor fault is triggered when any data page mapped under the highest-level page, which the example access tracker 202 can track to define the corresponding page as hot. additionally or Alternatively, the example flag controller 204 can reset a flag that is set by the hardware 105 whenever any data page mapped under the PUD page is accessed. In this manner, the example access tracker 202 can identify hot pages based on set flags.

At block 304, the example access tracker 202 waits a duration of time by tracking the timer 206. As described above in conjunction with FIG. 2, the duration of time may be defined by a user and/or manufacturer via a user interface and/or a configuration file. At block 306, the example access tracker 202 profiles the highest-level page(s) as part of a target group or not part of a target group because they were accessed during the duration of time (e.g., as hot or cold) based on flags and/or faults that are set by the hardware 105 whenever any data page mapped under the PUD page is accessed. For example, if a PUD corresponds to a triggered fault and/or flag that corresponds to access of a page mapped under the PUD, the access tracker 202 profiles the PUD as hot. If the PUD does not correspond to a fault and/or flag, the access tracker 202 profiles the PUD as cold. At block 307, the example access tracker 202 determines if there is/are one or more highest level page(s) profiled as cold. If the example access tracker 202 determines that there is not one or more highest level page(s) profiled as not part of the target group (e.g., profiled as cold) (block 307: NO), control continues to block 310. If the example access tracker 202 determines that there is/are one or more highest level page(s) profiled as not part of the target group (e.g., cold) (block 307: YES), the example access tracker 202 labels the corresponding lower level page(s) (e.g., the page(s) that (a) correspond to the cold highest level page and (b) are at lower levels than the cold highest level page) as not part of the target group (e.g., cold) (block 308).

At block 310, the example access tracker 202 determines if one or more of the highest-level page(s) (e.g., PUDs) were profiled as part of the target group (e.g., hot). If the example access tracker 202 determines that one or more of the highest-level page(s) (e.g., PUDs) were not profiled as part of the group (e.g., hot) (block 310: NO), the process returns to block 302 to repeat the process until a highest-level page is profiled as hot. If the example access tracker 202 determines that one or more of the highest-level page(s) (e.g., PUDs) were profiled as part of the target group (e.g., hot) (block 310: YES), the example flag controller 204 of the access tracker 202 marks the middle level page(s) (e.g., the PMDs) corresponding to the target highest-level page(s) (e.g., hot PUD(s)) of the previously profiling round as invalid (block 312). Additionally or alternatively, the example flag controller 204 can reset a flag that is set by the hardware 105 whenever any data page mapped under the PMD page is accessed.

At block 314, the example access tracker 202 waits a duration of time by tracking the timer 206. As described above in conjunction with FIG. 2, the duration of time may be defined by a user and/or manufacturer. At block 316, the example access tracker 202 profiles the middle level page(s) as part of the target group or not part of the target group (e.g., hot or cold) based on flags and/or faults that are set by the hardware 105 whenever any data page mapped under the PMD page is accessed. For example, if a PMD corresponds to a triggered fault and/or flag that corresponds to access of a page mapped under the PMD, the access tracker 202 profiles the PMD as part of the target group or hot. If the PMD does not correspond to a fault and/or flag, the access tracker 202 profiles the PMD as not part of the target group (e.g., cold). At block 317, the example access tracker 202 determines if there is/are one or more middle level page(s) profiled as not part of the target group (e.g., cold). If the example access tracker 202 determines that there is not one or more middle level page(s) profiled as not part of the target group (e.g., cold) (block 317: NO), control continues to block 320. If the example access tracker 202 determines that there is/are one or more middle level page(s) profiled as not part of the target group (e.g., cold) (block 317: YES), the example access tracker 202 labels the corresponding lower level page(s) (e.g., the page(s) that (a) correspond to the non-target (e.g., cold) middle level page and (b) are at lower levels than the non-target and/or cold middle level page) as not part of the target group (e.g., cold) (block 318).

At block 320, the example access tracker 202 determines if one or more of the middle level page(s) (e.g., PMDs) were profiled as part of the target (e.g., hot). If the example access tracker 202 determines that one or more of the middle level page(s) (e.g., PMDs) were not profiled as part of the target group (e.g., hot) (block 320: NO), the process continues to block 330 of FIG. 3B. If the example access tracker 202 determines that one or more of the middle level page(s) (e.g., PMDs) were profiled as part of the target group (e.g., hot) (block 320: YES), the example flag controller 204 of the access tracker 202 marks the low level page(s) (e.g., the PTEs) corresponding to the target (e.g., hot) middle level page(s) (e.g., hot PMD(s)) of the previously profiling round as invalid (block 322). Additionally or alternatively, the example flag controller 204 can reset a flag that is set by the hardware 105 whenever any data page mapped under the PTE page is accessed.

At block 324, the example access tracker 202 waits a duration of time by tracking the timer 206. At block 326, the example access tracker 202 profiles the lowest level page(s) as part of the target group or not part of the target group (e.g., hot or cold) based on flags and/or faults that are set by the hardware 105 whenever any data page mapped under the PTE page is accessed. For example, if a PTE corresponds to a triggered fault and/or flag that corresponds to access of a page mapped under the PTE, the access tracker 202 profiles the PTE as part of the target group (e.g., hot). If the PTE does not correspond to a fault and/or flag, the access tracker 202 profiles the PTE as not part of the target group (e.g., cold). If none of the faults and/or flags are triggered, none of the pages are labelled as not part of the target group (e.g., cold). At block 327, the example access tracker 202 determines if there is/are one or more lowest level page(s) profiled as not part of the target group (e.g., cold). If the example access tracker 202 determines that there is not one or more lowest level page(s) profiled as cold (block 327: NO), control continues to block 330. If the example access tracker 202 determines that there is/are one or more lowest level page(s) profiled as not part of the target group (e.g., cold) (block 327: YES), the example access tracker 202 labels the corresponding data page(s) (e.g., the data page(s) that correspond to the cold lowest level page) as not part of the target group (e.g., cold) (block 328).

At block 330, the example access tracker 202 determines if one or more of the lowest level page(s) (e.g., PTE(s)) were profiled as part of the target group (e.g., hot). If the example access tracker 202 determines that one or more of the lowest level page(s) (e.g., PTE(s)) were not profiled as part of the target group (e.g., hot) (block 330: NO), the process continues to block 340. If the example access tracker 202 determines that one or more of the lowest level page(s) (e.g., PTE(s)) were profiled as part of the target group (e.g., hot) (block 330: YES), the example flag controller 204 of the access tracker 202 marks the data page(s) corresponding to the target lowest level page(s) (e.g., hot PTE(s)) of the previously profiling round as invalid (block 332). Additionally or alternatively, the example flag controller 204 can reset a flag that is set by the hardware 105 whenever any data page is accessed.

At block 334, the example access tracker 202 waits a duration of time by tracking the timer 206. At block 336, the example access tracker 202 profiles the data page(s) as target (e.g., hot) based on flags and/or faults that are set by the hardware 105 whenever the data page is accessed. For example, if a data page corresponds to a triggered fault and/or flag that corresponds to access of the data page, the access tracker 202 profiles the data page as part of the target group (e.g., hot). If none of the faults and/or flags are triggered, none of the data pages are labelled as part of the target group (e.g., hot). At block 338, the example access tracker 202 profiles one or more of the data pages as not part of the target group (e.g., cold) based on flags or faults that are not set by the hardware 105. For example, if a data page does not correspond to a fault and/or flag, the access tracker 202 profiles the data page as not part of the target group (e.g., cold). If none of the faults and/or flags are triggered, none of the data pages are labelled as not part of the target group (e.g., cold).

At block 340, the example operating system 102 may instruct the hardware components 105 to read hot data pages from remote memory to be stored in the example local memory. At block 342, the example OS 102 determines if data pages labelled as cold that are currently stored in the local memory. If the example OS 102 determines that cold data page(s) is/are not stored in the example local memory 112 (block 342: NO), control continues to block 346. If the example OS 102 determines that cold data page(s) is/are stored in the example local memory 112 (block 342: YES), the example OS 102 instructs the hardware components 105 to move the cold data pages in the local memory 112 and store in the remote memory (block 344).

At block 346, the example OS 102 determines if mapping(s) of pages(s) (e.g., virtual address to physical address mappings) should be promoted/demoted to/from the huge pages list. For example, the user and/or manufacturer settings may define when page(s) should be promoted and/or demoted. If the example OS 102 determines that mapping(s) of page(s) should not be promoted and/or demoted (block 346: NO), the instructions end. If the example OS 102 determines that mapping(s) of page(s) should be promoted and/or demoted (block 346: YES), the example OS 102 instructs the hardware 105 to promote mappings of hot pages that are not stored in the huge pages (block 348). At block 350, the example OS 102 instructs the hardware 105 to demote mappings of cold pages that are included in the huge pages (block 350). After block 350, the instructions end.

Figure 4:
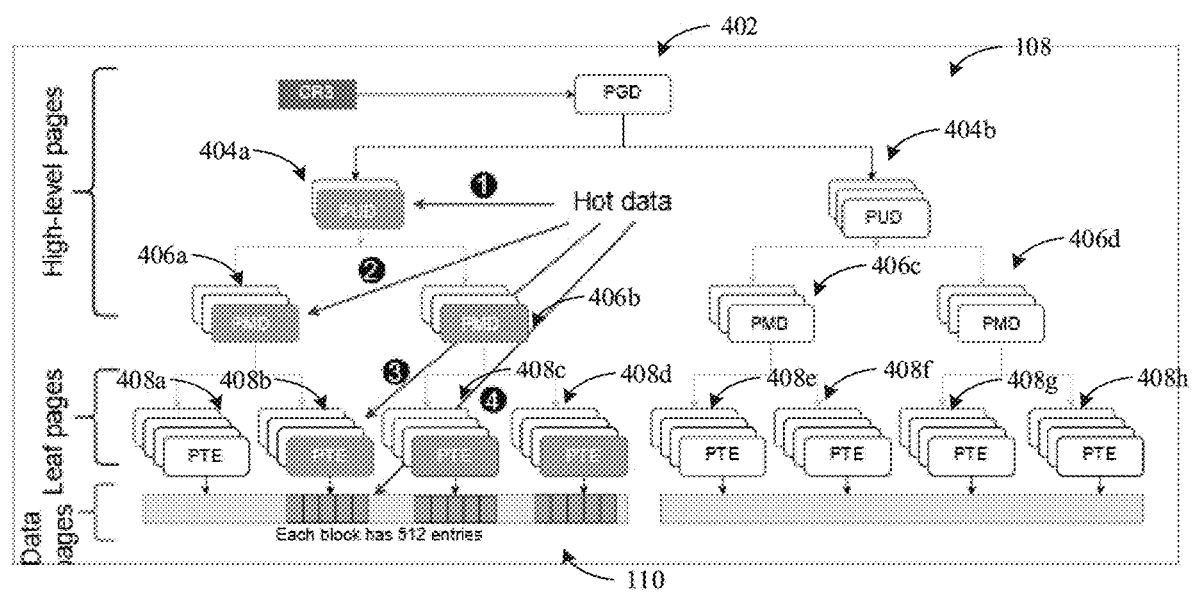
FIG. 4 is an example diagram of a tree structure of the page table of FIG. 1.

FIG. 4 illustrates an example profiling protocol corresponding to the example page table 108 and the example data pages 110 of FIG. 1. The example page table 108 includes an example page global director (PGD) page (also referred to as a node) 402, example PUD pages 404a-b, example PMD pages 406a-d, example PTEs 408a-h, and the example data pages 110 of FIG. 1. Although the example of FIG. 4 illustrates a particular structure with a particular number of pages at four levels (e.g., also referred to as layers), the example page table 108 may include any number of levels and/or pages in any tree structure.

The example PGD 402 of FIG. 4 is the highest node and/or page of the tree structure. Under the highest node is a subsequent level of high-level pages corresponding to the example PUDs 404a-b. Under each of the PUDs 404a-b is a next highest level (e.g., a middle level) of the PMDs 406a-d. The example PMDs 406a-b correspond to (e.g., are implemented below) the example PUD 404a and the PMDs 406c-d correspond to the example PUD 404b. Under each of the PMDs 406a-d is the lowest level of PTEs 408a-h (also referred to as leaf pages). The example PTEs 408a-b correspond to (e.g., are implemented below) the example PMD 406a, the example PTEs 408c-d correspond to the example PMD 406b, the example PTEs 406e-f correspond to the example PMD 406c, and the example PTEs 406g-h correspond to the example PMD 406d.

During a first profiling round, the example page table profiler 104 profiles the PUDs 404a-b, as described above. After the first profiling round, the example page table profiler 104 determines that the example PUD 404a is hot and the example PUD 404b is cold. Accordingly, the example page table profiler 104 labels all the pages below the PUD 404b as cold (e.g., the PMDs 406c-d, PTEs 408e-h, and the data pages that correspond to the PTES 408e-h). After the PUD 404a is profiled as hot, the example page table profiler 104 resets the flags and performs a subsequent profiling round at the PMD level. During the subsequent profile round, the example page table profiler 104 determines that both PMDs 406a-b are hot. Accordingly, the example page table profiler 104 resets the flags and performs a subsequent profiling round at the PTE level.

During the subsequent profile round, the example page table profiler 104 determines that PTE 408a is cold and PTEs 408b-d are hot. Accordingly, the example page table profiler 104 labels all the data pages that correspond to the PTE 408a as cold and resets the flags and performs a subsequent profiling round at the data page level for the data pages that correspond to hot PTEs 408b-d. In this manner, the example page table profiler 104 can identify the hot data pages that correspond to the hot PTEs 408b-d to complete the profiling protocol for all data pages.

Figure 5:
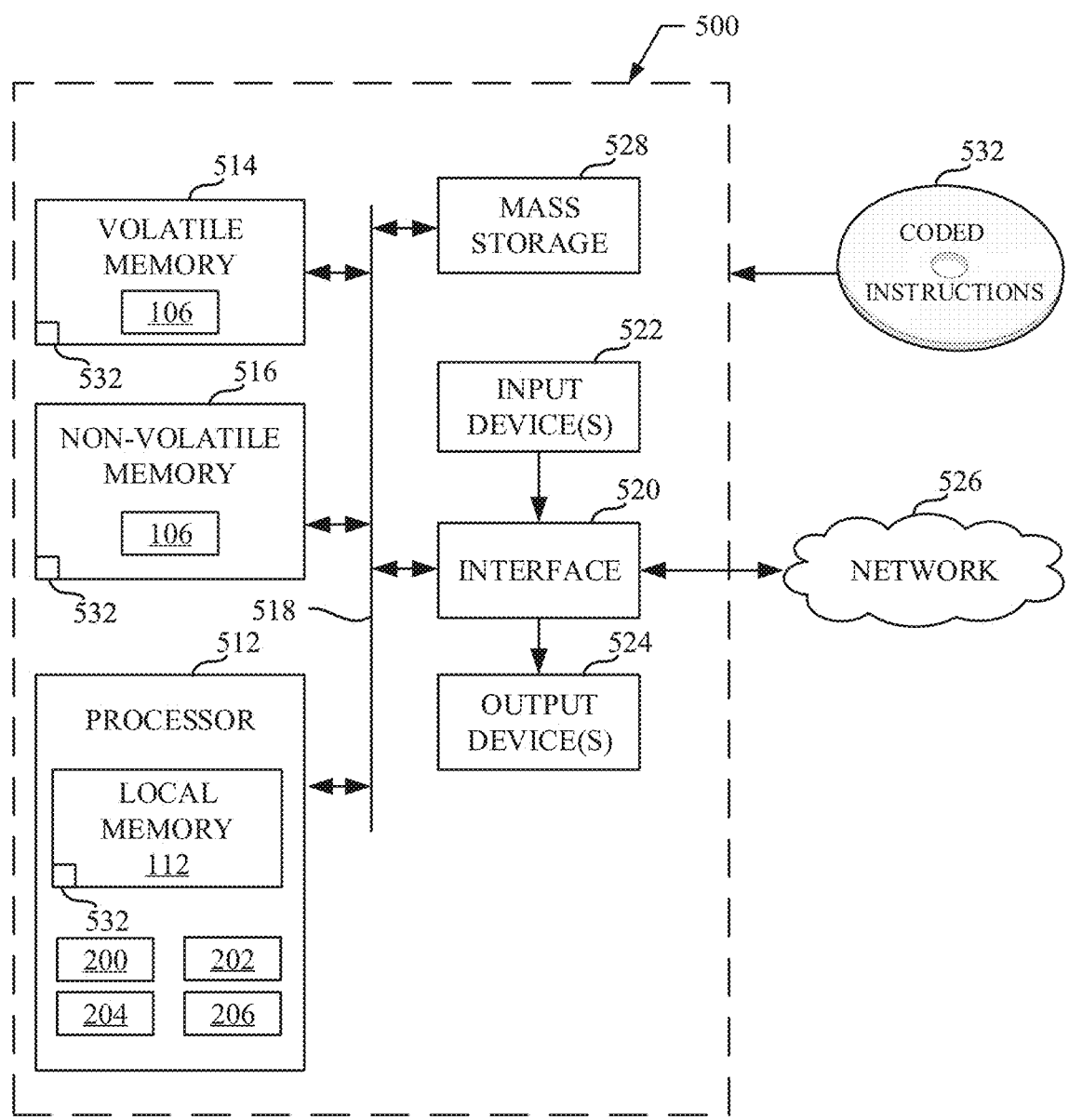
FIG. 5 is a block diagram of an example processor platform structured to execute the instructions of FIGS. 3A-3C to implement the page table profiler of FIG. 2.

FIG. 5 is a block diagram of an example processor platform 500 structured to execute the instructions of FIGS. 3A-3C to implement the example page table profiler 104 and/or the OS 102 of FIGS. 1 and/or 2. The processor platform 500 can be, for example, a server, a personal computer, a workstation, a self-learning machine (e.g., a neural network), a mobile device (e.g., a cell phone, a smart phone, a tablet such as an iPad™), or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example component interface 200, the example access tracker 202, the example flag controller 204, and the example timer 206 of FIG. 2.

The processor 512 of the illustrated example includes a local memory 112 (e.g., a local memory). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller. In the example of FIG. 5, the example main memories 514, 516 implements the example remote memory.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface. In the example of FIG. 5, the interface circuit 520 implements the interface 200 of FIG. 2. However, the interface 20 may be a separate component from the interface circuit 520 of FIG. 5.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip, and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of 3A-3C may be stored in the mass storage device 528, in the volatile memory 514, in the non-volatile memory 516, and/or on a removable non-transitory computer readable storage medium such as a CD or DVD.

Figure 6:
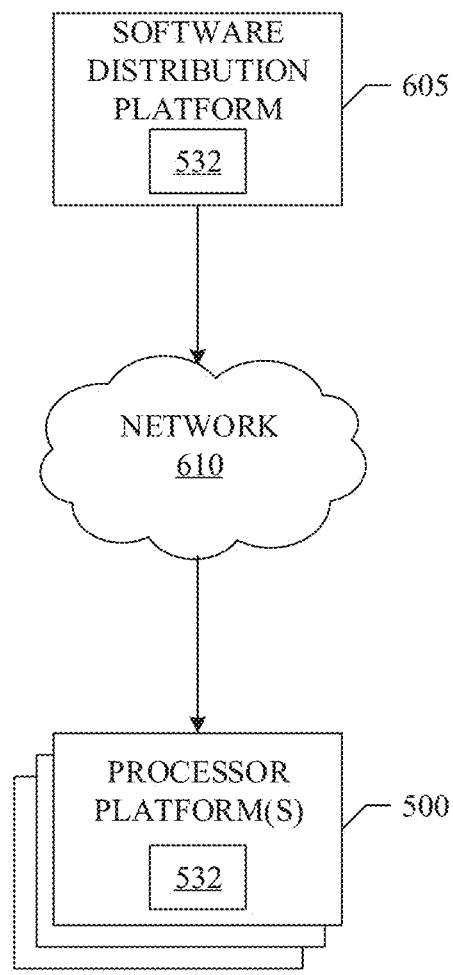
FIG. 6 is a block diagram of an example software distribution platform to distribute software (e.g., software corresponding to the example computer readable instructions of FIGS. 3A-3C to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 605 to distribute software such as the example computer readable instructions 300, 532 of FIGS. 3A-3C and/or 5 to third parties is illustrated in FIG. 6. The example software distribution platform 605 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 300, 532 of FIGS. 3A-3C and/or 5. The third parties may be consumers, users, retailers, OEMs, etc., who purchase and/or license the software for use and/or re-sale and/or sub-licensing. In the illustrated example, the software distribution platform 605 includes one or more servers and one or more storage devices. The storage devices store the computer readable instructions 532, which may correspond to the example computer readable instructions 300, 532 of FIGS. 3A-3C and/or 5, as described above. The one or more servers of the example software distribution platform 605 are in communication with a network 610. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 532 from the software distribution platform 605. For example, the software, which may correspond to the example computer readable instructions 300, 532 of FIGS. 3A-3C and/or 5, may be downloaded to the example processor platform 500, which is to execute the computer readable instructions 532 to implement the OS 102 and/or the page table profiler 104. In some example, one or more servers of the software distribution platform 605 periodically offer, transmit, and/or force updates to the software (e.g., the example computer readable instructions 300, 532 of FIGS. 3A-3C and/or 5) to ensure improvements, patches, updates, etc. are distributed and applied to the software at the end user devices.

Example methods, apparatus, systems, and articles of manufacture to profile page tables for memory management are disclosed herein. Further examples and combinations thereof include the following: Example 1 includes an apparatus to profile page table, the apparatus comprising processor circuitry to execute computer readable instructions to at least profile a first page at a first level of a page table as not part of a target group, and in response to profiling the first page as not part of the target group, label a data page at a second level that corresponds to the first page as not part of the target group, the second level being lower than the first level.

Example 2 includes the apparatus of example 1, wherein the processor circuitry is to determine that the first page is not part of the target group when none of a plurality of data pages that correspond to the first page have been accessed by hardware within a duration of time.

Example 3 includes the apparatus of example 1, wherein the first page is at least one of a page upper directory, a page middle directory, or a page table entry.

Example 4 includes the apparatus of example 1, wherein the processor circuitry is to profile a second page at the first level of the page table as part of the target group, and in response to profiling the second page as part of the target group, profile a third page at the second level lower than the first level of the page table.

Example 5 includes the apparatus of example 4, wherein the processor circuitry is to determine that the second page is part of the target group when at least one of a plurality of data pages that corresponds to the second page has been accessed by hardware within a duration of time.

Example 6 includes the apparatus of example 4, wherein the data page is a first data page, the processor circuitry to, when the third page at the second level is profiled as part of the target group, profile a fourth page at a third level lower than the second level of the page table, the fourth page being a second data page stored in remote memory.

Example 7 includes the apparatus of example 6, wherein the processor circuitry is to store the fourth page in local memory in response to profiling the fourth page as part of the target group.

Example 8 includes the apparatus of example 7, wherein the page table is cold when not part of the target group and the page table is hot when part of the target group.

Example 9 includes the apparatus of example 1, wherein the page table is a mapping of virtual addresses to physical address of data pages stored in remote memory.

Example 10 includes the apparatus of example 1, wherein the processor circuitry is to, if the data page is stored in local memory, remove the data page from the local memory in response to labelling the data page as not part of the target group.

Example 11 includes the apparatus of example 1, wherein the page table is cold when not part of the target group and the page table is hot when part of the target group.

Example 12 includes the apparatus of example 1, wherein the data page is stored in remote memory.

Example 13 includes a non-transitory computer readable storage medium comprising instructions which, when executed, cause one or more processors to at least profile a first page at a first level of a page table as not part of a target group, and in response to profiling the first page as not part of the target group, label a data page at a second lower level that corresponds to the first page as not part of the target group.

Example 14 includes the computer readable storage medium of example 13, wherein the one or more processors are to determine that the first page is not part of the target group when none of a plurality of data pages that correspond to the first page have been accessed by hardware within a duration of time.

Example 15 includes the computer readable storage medium of example 13, wherein the first page is at least one of a page upper director, a page middle directory, or a page table entry.

Example 16 includes the computer readable storage medium of example 13, wherein the one or more processors are to is to profile a second page at the first level of the page table as part of the target group, and in response to profiling the second page as part of the target group, profile a third page at a second level lower than the first level of the page table.

Example 17 includes the computer readable storage medium of example 16, wherein the one or more processors are to is to determine that the second page is part of the target group when at least one of a plurality of data pages that corresponds to the second page have been accessed by hardware within a duration of time.

Example 18 includes the computer readable storage medium of example 16, wherein the data page is a first data page, the one or more processors to, when the third page at the second level is profiled as part of the target group, profile a fourth page at a third level lower than the second level of the page table, the fourth page being a second data page stored in remote memory.

Example 19 includes the computer readable storage medium of example 18, wherein the one or more processors are to store a copy of the fourth page in local memory in response to profiling the fourth page as part of the target group.

Example 20 includes the computer readable storage medium of example 19, wherein the page table is cold when not part of the target group and the page table is hot when part of the target group.

Example 21 includes the computer readable storage medium of example 13, wherein the page table is a mapping of virtual addresses to physical address of data pages stored in remote memory.

Example 22 includes the computer readable storage medium of example 13, wherein the one or more processors are to, if the data page is stored in local memory, remove the data page from the local memory in response to labelling the data page as not part of the target group.

Example 23 includes the computer readable storage medium of example 13, wherein the data page is stored is in remote memory.

Example 24 includes an apparatus to a profile data page, the apparatus comprising means for storing a data page, means for profiling data pages, the means for profiling to profile a first page at a first level of a page table as not part of a target group, and in response to profiling the first page as not part of the target group, label the data page at a second lower level that corresponds to the first page as not part of the target group.

Example 25 includes the apparatus of example 24, wherein the means for profiling is to determine that the first page is not part of the target group when none of a plurality of data pages that correspond to the first page have been accessed by hardware within a duration of time.

Example 26 includes the apparatus of example 24, wherein the first page is at least one of a page upper director, a page middle directory, or a page table entry.

Example 27 includes the apparatus of example 24, wherein the means for profiling is to profile a second page at the first level of the page table as part of the target group, and in response to profiling the second page as part of the target group, profile a third page at a second level lower than the first level of the page table.

Example 28 includes the apparatus of example 27, wherein the means for profiling is to determine that the second page is part of the target group when at least one of a plurality of data pages that corresponds to the second page have been accessed by hardware within a duration of time.

Example 29 includes the apparatus of example 27, wherein the data page is a first data page, the means for profiling to, when the third page at the second level is profiled as part of the target group, profile a fourth page at a third level lower than the second level of the page table, the fourth page being a second data page stored in the means for storing.

Example 30 includes the apparatus of example 29, wherein the means for profiling is to store a copy of the fourth page in local memory in response to profiling the fourth page as part of the target group.

Example 31 includes the apparatus of example 30, wherein the page table is cold when not part of the target group and the page table is hot when part of the target group.

Example 32 includes the apparatus of example 24, wherein the data page is stored in remote memory.

Example 33 includes a method to a profile data page, the method comprising profiling a first page at a first level of a page table as not part of a target group, and in response to profiling the first page as not part of the target group, labeling a data page at a second lower level that corresponds to the first page as not part of the target group.

Example 34 includes the method of example 33, further including determining that the first page is not part of the target group when none of a plurality of data pages that correspond to the first page have been accessed by hardware within a duration of time.

Example 35 includes the method of example 33, wherein the first page is at least one of a page upper director, a page middle directory, or a page table entry.

Example 36 includes the method of example 33, further including profiling a second page at the first level of the page table as part of the target group, and in response to profiling the second page as part of the target group, profiling a third page at a second level lower than the first level of the page table.

Example 37 includes the method of example 36, further including determining that the second page is part of the target group when at least one of a plurality of data pages that corresponds to the second page have been accessed by hardware within a duration of time.

Example 38 includes the method of example 36, wherein the data page is a first data page, further including, when the third page at the second level is profiled as part of the target group, profiling a fourth page at a third level lower than the second level of the page table, the fourth page being a second data page stored in remote memory.

Example 39 includes the method of example 38, further including storing the fourth page in local memory in response to profiling the fourth page as part of the target group.

Example 40 includes the method of example 39, wherein the page table is cold when not part of the target group and the page table is hot when part of the target group.

Example 41 includes the method of example 33, wherein the page table is a mapping of virtual addresses to physical address of data pages stored in remote memory.

Example 42 includes the method of example 33, further including, if the data page is stored in local memory, removing the data page from the local memory in response to labelling the data page as not part of the target group.

Example 43 includes the method of example 33, wherein the data page is stored in remote memory.

From the foregoing, it will be appreciated that example methods, apparatus and articles of manufacture have been disclosed herein to profile page table pages for memory management. Disclosed methods, apparatus and articles of manufacture improve the efficiency of a computer by leveraging the hierarchy structure of a page table to profile data pages in main memory based on the status of the pages in the profile table. In this manner, the amount of data pages that are processed to profile the data pages is reduced, thereby reducing profiling time, decreasing resources, and opening up the OS to perform different tasks. Accordingly, disclosed methods, apparatus and articles of manufacture are directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to profile page table, the apparatus comprising:
    interface circuitry to obtain a page table of data pages, the page table including a first data page at a first level and second data pages at a second level, the second level being lower than the first level, the first data page including the second data pages;
    machine readable instructions; and
    at least one processor circuit to be programmed by the machine readable instructions to at least:
        profile the first data page at the first level of the page table as not part of a target group based on the first data page not being accessed within a threshold amount of time; and
        label the second data pages as not part of the target group based on the first data page not being part of the target group.

2. The apparatus of claim 1, wherein one or more of the at least one processor circuit is to determine that the first data page is not part of the target group based on a flag, wherein hardware is to set the flag for the first data page if one or more of the second data pages has been accessed by the hardware within a duration of time.

3. The apparatus of claim 1, wherein the first data page is at least one of a page upper directory, a page middle directory, or a page table entry.

4. The apparatus of claim 1, wherein one or more of the at least one processor circuit is to:
profile a third data page at the first level of the page table as part of the target group, the third data page including fourth data pages; and
after the profiling of the third data page as part of the target group, profile the fourth data pages at the second level.

5. The apparatus of claim 4, wherein one or more of the at least one processor circuit is to determine that the second third data page is part of the target group when at least one the fourth data pages that corresponds to the third data page has been accessed by hardware within a duration of time.

6. The apparatus of claim 4, wherein one or more of the at least one processor circuit is to, when the fourth data pages at the second level are profiled as part of the target group, profile fifth data pages at a third level, the third level lower than the second level of the page table, the fifth data pages stored in remote memory.

7. The apparatus of claim 6, wherein one or more of the at least one processor circuit is to store a sixth data page of the fifth data pages in local memory after profiling the sixth data page as part of the target group.

8. The apparatus of claim 7, wherein the page table is cold when not part of the target group and the page table is hot when part of the target group.

9. The apparatus of claim 1, wherein the page table is a mapping of virtual addresses to physical address of data pages stored in remote memory.

10. The apparatus of claim 1, wherein one or more of the at least one processor circuit is to, if the one or more of the second data pages is stored in local memory, remove the one or more of the second data pages from the local memory after a labelling of the one or more of the second data pages as not part of the target group.

11. The apparatus of claim 1, wherein the page table is cold when not part of the target group and the page table is hot when part of the target group.

12. The apparatus of claim 1, wherein the first data page is stored in remote memory.

13. A non-transitory computer readable storage medium comprising instructions to cause at least one processor circuit to at least:
profile a first data page at a first level of a page table as not part of a target group based on the first data page not being accessed within a threshold amount of time, the page table including the first data page at the first level and second data pages at a second level being lower than the first level, the first data page including the second data pages; and
label the second data pages as not part of the target group based on the first data page not being part of the target group.

14. The computer readable storage medium of claim 13, wherein the instructions are to cause one or more of the at least one processor circuit to determine that the first data page is not part of the target group based on a flag, wherein hardware is to set the flag for the first data page if one or more of the second data pages has been accessed by the hardware within a duration of time.

15. The computer readable storage medium of claim 13, wherein the first data page is at least one of a page upper director, a page middle directory, or a page table entry.

16. The computer readable storage medium of claim 13, wherein the instructions are to cause one or more of the at least one processor circuit to:
profile a third data page at the first level of the page table as part of the target group, the third data page including fourth data pages; and
after the profiling of the third data page as part of the target group, profile the fourth data pages at the second level lower than the first level of the page table.

17. The computer readable storage medium of claim 16, wherein the instructions are to cause one or more of the at least one processor circuit to determine that the third data page is part of the target group when at least one of the fourth data pages that corresponds to the third data page have been accessed by hardware within a duration of time.

18. The computer readable storage medium of claim 16, wherein the instructions are to cause one or more of the at least one processor circuit to, when the fourth data pages at the second level are profiled as part of the target group, profile a fifth data pages at a third level, the third level lower than the second level of the page table, the fifth data pages stored in remote memory.

19. The computer readable storage medium of claim 18, wherein the instructions are to cause one or more of the at least one processor circuit to store a sixth data page of the fifth data pages in local memory after a profiling of the sixth data page as part of the target group.

20. The computer readable storage medium of claim 19, wherein the page table is cold when not part of the target group and the page table is hot when part of the target group.

21. The computer readable storage medium of claim 13, wherein the page table is a mapping of virtual addresses to physical address of data pages stored in remote memory.

22. The computer readable storage medium of claim 13, wherein the instructions are to cause one or more of the at least one processor circuit to, if the one or more of the second data pages is stored in local memory, remove the one or more of the second data pages from the local memory after a labelling of the one or more of the second data pages as not part of the target group.

23. The computer readable storage medium of claim 13, wherein the first data page is stored in remote memory.

24. An apparatus to a profile data page, the apparatus comprising:
means for obtaining a page table of data pages, the page table including a first data page at a first level and second data pages at a second level being lower than the first level, the first data page including the second data pages;
means for profiling the data pages, the means for profiling to:
profile the first data page at the first level of the page table as not part of a target group based on the first data page not being accessed within a threshold amount of time; and
label the second data pages as not part of the target group based on the first data page not being part of the target group.

25. The apparatus of claim 24, wherein the means for profiling is to determine that the first data page is not part of the target group based on a flag, wherein hardware is to set the flag for the first data page if one or more of the second data pages has been accessed by the hardware within a duration of time.

* * * * *

UNITED STATES PATENT AND TRADEMARK OFFICE
CERTIFICATE OF CORRECTION

| | | |
|---|---|---|
| PATENT NO. | : 12,242,721 B2 | Page 1 of 1 |
| APPLICATION NO. | : 17/214534 | |
| DATED | : March 4, 2025 | |
| INVENTOR(S) | : Prasad et al. | |

It is certified that error appears in the above-identified patent and that said Letters Patent is hereby corrected as shown below:

In the Claims

Column 19, Claim 5, Line 16, Delete "second".

Signed and Sealed this
Fifteenth Day of April, 2025

Coke Morgan Stewart
*Acting Director of the United States Patent and Trademark Office*